US009191234B2

(12) United States Patent
Blouin et al.

(10) Patent No.: US 9,191,234 B2
(45) Date of Patent: Nov. 17, 2015

(54) ENHANCED COMMUNICATION BRIDGE

(75) Inventors: Francois Blouin, Gatineau (CA); Leigh Thorpe, Ottawa (CA); Tim Rahrer, Ottawa (CA); Tadeusz Drwiega, Kanata (CA); Rafi Rabipour, Cote St-Luc (CA)

(73) Assignee: RPX Clearinghouse LLC, San Francisco, CA (US)

( * ) Notice: Subject to any disclaimer, the term of this patent is extended or adjusted under 35 U.S.C. 154(b) by 1101 days.

(21) Appl. No.: 12/420,976

(22) Filed: Apr. 9, 2009

(65) Prior Publication Data
US 2010/0260074 A1 Oct. 14, 2010

(51) Int. Cl.
| | |
|---|---|
| H04M 3/42 | (2006.01) |
| H04L 12/46 | (2006.01) |
| H04L 29/06 | (2006.01) |
| H04M 3/22 | (2006.01) |
| H04M 7/12 | (2006.01) |

(52) U.S. Cl.
CPC .......... *H04L 12/462* (2013.01); *H04L 65/1093* (2013.01); *H04L 65/403* (2013.01); *H04L 65/605* (2013.01); *H04M 3/2236* (2013.01); *H04M 7/1205* (2013.01)

(58) Field of Classification Search
CPC .................. H04M 3/56; H04M 3/568; H04M 2203/5063; H04M 3/565; H04M 2203/2072; H04M 3/42059; H04M 3/566; H04M 2203/5072; H04M 2203/5081; H04M 3/002
USPC .............................. 379/202.01; 370/351, 352
See application file for complete search history.

(56) References Cited

U.S. PATENT DOCUMENTS

| | | | | | |
|---|---|---|---|---|---|
| 4,475,190 | A | * | 10/1984 | Marouf et al. | 370/260 |
| 6,097,820 | A | * | 8/2000 | Turner | 381/94.3 |
| 6,463,414 | B1 | * | 10/2002 | Su et al. | 704/270.1 |
| 6,556,817 | B1 | * | 4/2003 | Souissi et al. | 455/406 |

(Continued)

FOREIGN PATENT DOCUMENTS

| | | |
|---|---|---|
| CN | 1856090 A | 11/2006 |
| CN | 1964397 A | 5/2007 |

(Continued)

OTHER PUBLICATIONS

Written Opinion of the International Searching Authority from corresponding PCT application PCT/CA2010/000534.

(Continued)

*Primary Examiner* — Oleg Asanbayev
(74) *Attorney, Agent, or Firm* — Withrow & Terranova PLLC

(57) ABSTRACT

An enhanced communication bridge includes a context interface that enables the audio bridge to learn information about the type of Voice encoder, device, network connection, location, type of call (business vs. personal), identity and position of the individual, and other information about the context of the communication session itself as well as the context of each person joining the communication session. This context information is used to determine how quality of experience targets for the communication as a whole, as well as how each individual contribution should be uniquely processed to attempt to meet the quality of experience targets. Business factors may influence the decision as to the type of processing to be implemented on each of the signals provided by the participants. Corrective action may also be implemented by the bridge on the client network devices as well in the embodiment. The bridge may be centralized or distributed. A video bridge may be implemented as well.

21 Claims, 2 Drawing Sheets

(56) References Cited

U.S. PATENT DOCUMENTS

| | | | |
|---|---|---|---|
| 7,079,852 B1 * | 7/2006 | Budnik | 455/456.5 |
| 7,738,643 B1 * | 6/2010 | Garrison et al. | 379/203.01 |
| 2004/0174973 A1 * | 9/2004 | O'Malley et al. | 379/202.01 |
| 2005/0058088 A1 | 3/2005 | Decker et al. | |
| 2005/0213738 A1 | 9/2005 | Rodman et al. | |
| 2005/0276234 A1 * | 12/2005 | Feng et al. | 370/260 |
| 2006/0288096 A1 * | 12/2006 | Yim | 709/224 |
| 2008/0059581 A1 | 3/2008 | Pepperell | |
| 2008/0159510 A1 * | 7/2008 | Julien et al. | 379/202.01 |
| 2008/0160977 A1 | 7/2008 | Ahmaniemi et al. | |
| 2008/0226039 A1 * | 9/2008 | Goldman et al. | 379/45 |
| 2008/0226051 A1 | 9/2008 | Srinivasan | |
| 2008/0261586 A1 * | 10/2008 | Joensuu | 455/424 |
| 2009/0132240 A1 * | 5/2009 | Zinser et al. | 704/201 |
| 2009/0296610 A1 * | 12/2009 | Bugenhagen | 370/286 |

FOREIGN PATENT DOCUMENTS

| | | |
|---|---|---|
| JP | 08046704 A | 2/1996 |
| JP | 2007202158 A | 8/2007 |
| WO | 2010115285 A1 | 10/2010 |

OTHER PUBLICATIONS

First Office Action for Chinese Patent Application No. 201080025387.6, mailed Nov. 5, 2013, 16 pages.

Patent Examination Report No. 1 for Australian Patent Application No. 2010234200, issued Jul. 25, 2014, 4 pages.

Second Office Action for Chinese Patent Application No. 201080025387.6, mailed Jun. 30, 2014, 3 pages (no English translation).

Decision to Grant for Japanese Patent Application No. 2012-503840, issued Mar. 11, 2014, 6 pages.

European Search Report for European Application No. 10761160.0, issued May 15, 2014, 16 pages.

\* cited by examiner

ENHANCED COMMUNICATION BRIDGE

BACKGROUND

1. Field

This application relates to communication networks and, more particularly, to a method and apparatus for providing an enhanced communication bridge.

2. Description of the Related Art

Data communication networks may include various computers, servers, nodes, routers, switches, hubs, proxies, and other devices coupled to and configured to pass data to one another. These devices will be referred to herein as "network elements," and may provide a variety of network resources on the network. Data is communicated through data communication networks by passing protocol data units (such as packets, cells, frames, or segments) between the network elements over communication links on the network. A particular protocol data unit may be handled by multiple network elements and cross multiple communication links as it travels between its source and its destination over the network. Hosts such as computers, telephones, cellular telephones, Personal Digital Assistants, and other types of consumer electronics connect to and transmit/receive data over the communication network and, hence, are users of the communication services offered by the communication network.

A telephone call may be established to connect two, three, or a small number of people and enable those individuals to talk with each other on a communication network. When a larger number of people want to participate in the telephone call, an audio bridge may be used. An audio bridge basically receives input from the participants, selects two, three, or another small number of signals to be mixed, and provides the mixed audio to each of the participants. This allows many people to simultaneously talk and listen to a given communication over the network. Audio bridges have been around for many years and are well known in the art.

Unfortunately, conventional audio bridges do not always provide high sound quality. For example, one person may naturally talk very loudly while another talks very quietly. This imbalance may make it difficult for participants to adjust the sound level so that they can hear everyone on the conference call. Similarly, different participants may connect to the audio bridge using different communication technologies which may have a deleterious effect on the overall sound quality provided by the audio bridge. For example, conference participants may connect using cellular, IP-based, wireless IP-based, or other types of handsets. Each of these connection technologies may have different sound characteristics which may cause the overall audio provided by the audio bridge to have reduced audio qualities.

SUMMARY OF THE DISCLOSURE

An enhanced communication bridge includes a context interface that enables the audio bridge to learn information about the type of Voice encoder, device, network connection, location, type of call (business vs. personal), identity and position of the individual, and other information about the context of the communication session itself as well as the context of each person joining the communication session. This context information is used to determine how quality of experience targets for the communication as a whole, as well as how each individual contribution should be uniquely processed to attempt to meet the quality of experience targets. Business factors may influence the decision as to the type of processing to be implemented on each of the signals provided by the participants. Corrective action may also be implemented by the bridge on the client network devices as well in the embodiment. The bridge may be centralized or distributed. A video bridge may be implemented as well.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
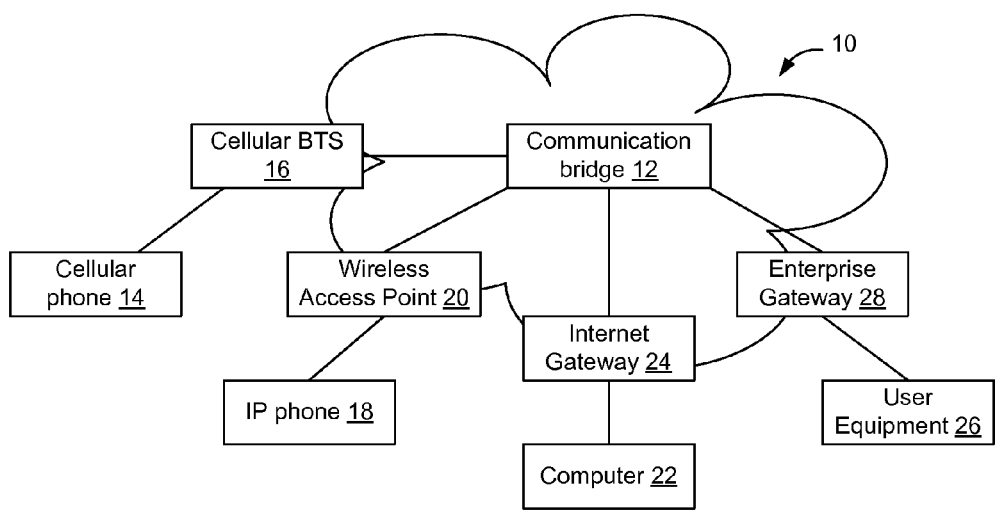
FIG. 1 is a functional block diagram of an example of a communication network according to an embodiment of the invention.

FIG. 1 illustrates an example communication network 10 on which a multi-party communication session may be implemented. The multi-party communication session may be an audio call and, optionally, may include video content as well. As used herein, the term "communication bridge" will be used to refer to a device that is capable of connecting multiple parties during a communication session. The communication session may be an audio communication session or may be an audio/video communication session. Thus, the term communication bridge is used herein as a generic term that encompasses conventional audio-only bridges as well as bridges capable of handling both audio and video data. Although parts of the description may refer to audio, the invention is not limited to audio-only bridges as the same techniques may be used to handle audio on a multi-party audio-video communication session.

FIG. 1 shows an example communication network over which a multi-party communication session may be established. In the example communication network shown in FIG. 1, the network 10 includes an enhanced communication bridge 12, an embodiment of which is described below in connection with FIG. 3. People may connect to the communication bridge 12 using many different access technologies. Since these connection technologies have different characteristics, according to an embodiment of the invention, the enhanced communication bridge is able to determine the context associated with the call itself as well as with each participant. The enhanced communication bridge will use the context information to adjust the audio processing for that particular participant in view of Quality of Experience and business metrics. This enables the communication bridge to adjust the processing that is applied to each of the participant audio streams, so that the output audio is consistent with expectations for the type of communication session. Likewise, the communication bridge will use the business factors to conduct capacity vs. quality tradeoffs to minimize Operational Expenses (OpEx) to determine which processing makes sense, from a business standpoint, to enable revenue generation, key user quality of experience, and processing resources to be optimized by the communication bridge.

For example, a person on a communication session may be a client or customer who the other participants may want to hear during the call. The communication bridge may preferentially select the audio stream from that person to be included as one of the mixed output audio streams to enable the person to be heard. The classification of participants may be included as part of the business factors to enable different classifications to be provided to participants depending on the type of communication session. Thus, for example, based on the business criticality of the communications (e.g. a customer conference call) the communication bridge may deploy more processing to ensure high quality of experience. Likewise, the communication bridge may bias the customer's line for best quality, and to ensure that the customer is able to break into the conversation easily. For bridges that don't generate revenue directly, use of the processing elements of the communication bridge may be optimized to ensure that the bridge can support the highest number of simultaneous calls and users as possible.

FIG. 1 shows several example access technologies that may be used to connect to a communication session. For example, a person may talk on a cellular telephone 14 via a cellular access network, e.g. via base transceiver station 16, to join a communication session hosted by the communication bridge. Similarly, another user may have a wireless IP phone 18 that the user may use to connect to a communication session via a wireless access point 20. Other users may have soft telephony clients loaded onto their laptop or desktop computers, PDAs, or other computing devices 22. These users may connect to a communication session over the Internet via gateway 24. Still other users may join the communication session from user equipment 26 (IP phone, soft client, etc.) connected to an enterprise network. Where the communication bridge is located external to the enterprise network, the user may connect to the communication session via an enterprise gateway 28. Many other ways of connecting to the bridge may exist as well, or may be developed over time, and the selection shown in FIG. 1 is not intended to be limiting.

As illustrated in FIG. 1, there are many different ways for a person to connect to a communication session. Depending on the particular device and access technology used to connect to the communication session, the characteristics of the signals received by the communication bridge from the user may vary considerably. According to an embodiment of the invention, the communication bridge determines the context information associated with each participant and uses the context information to process the signals from that participant as well as signals going to that participant. This enables the communication bridge to adapt to the particular way that the user has connected to the communication session to increase the clarity of the resultant mixed audio output by the communication bridge.

Figure 2A:
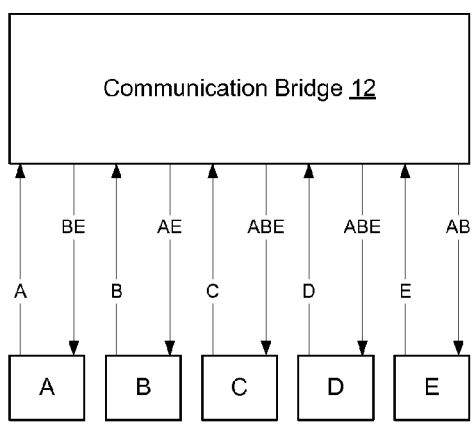
FIGS. 2A and 2B are functional block diagrams showing the flow of information between participants A-E and two types of communication bridges.

FIG. 2A shows an example of how a communication bridge can operate to enable multiple people to talk to each other during a communication session. In the example shown in FIG. 2A, the communication bridge will receive input audio from each of the participants that are connecting to a particular communication session. In this example, there are five participants A, B, C, D, and E. A communication session may have hundreds of participants and the invention is not limited to this particular example. The communication bridge will select a subset of the inputs to be mixed together and presented to the participants. In this example, the communication bridge has selected the input from participants A, B, and E to be mixed together and provided as output audio on the communication session. Accordingly, each non-active participant will be provided with an output audio stream including the mixed input from participants A, B, and E. The active participants receive a mix that does not include their own voice, so A will receive B and E mixed, B will receive A and E mixed and E will receive A and B mixed.

Figure 2B:
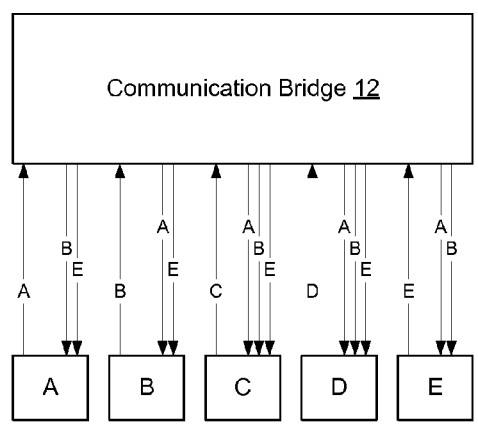

FIG. 2B shows another type of communication bridge in which the selection function is performed centrally by the communication bridge, but in which the mixing occurs in a distributed manner. In a distributed bridge such as the bridge shown in FIG. 2B, the communication bridge 12 will determine which participants should be heard on the communication session and will output multiple voice streams to each of the participants. For example, in FIG. 2B the communication bridge has selected participants A, B, and E to be heard on the communication session. Accordingly, the bridge has output voice stream A, voice stream B, and voice stream E, to each of the participants. The participants have a local mixing function that will mix these input voice streams so that the users may listen to the mixed audio. The aspects of the invention described herein may be applied to either type of bridge.

Figure 3:
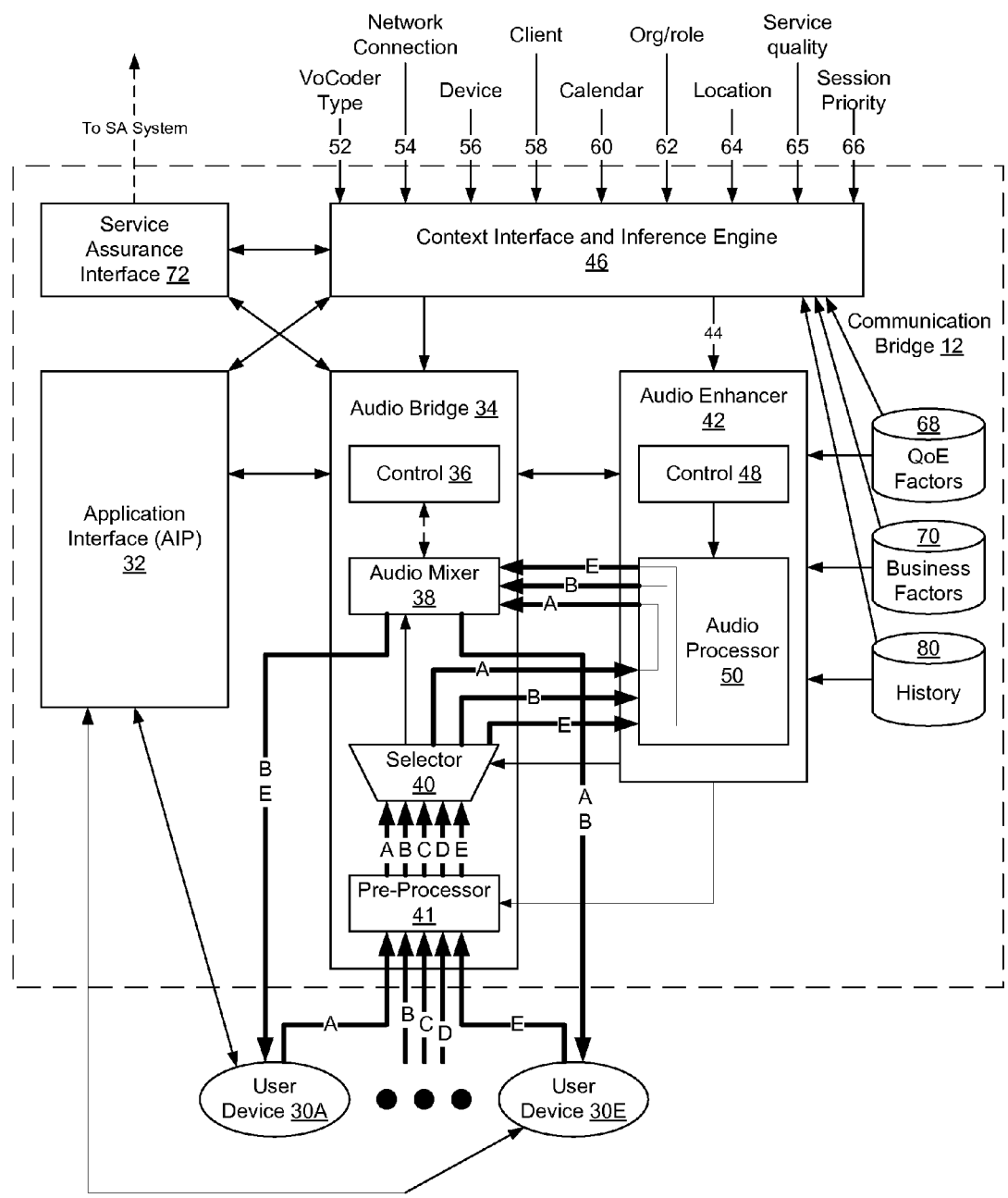
FIG. 3 is a functional block diagram of an example enhanced communication bridge according to an embodiment of the invention.

FIG. 3 shows an example enhanced communication bridge 12 according to an embodiment of the invention. In the example shown in FIG. 3, users connect to the communication bridge 12 via user devices 30A-30F. Each user may connect to the communication bridge using the same user device or may use a different user device. In general, it may be expected that users will connect to the communication bridge using whatever type of user device is convenient and available to that particular user.

In the embodiment shown in FIG. 3, the communication bridge has an application interface 32 that users will interact with when initiating a communication session, joining a communication session, during the communication session, and optionally in connection with leaving a communication session. For example, the communication bridge may be accessed by dialing a particular telephone number. When the user dials the access telephone number for the communication session, the user will be connected to the application interface that may ask the user for a conference ID number, security access code, or other similar information. Typically the application interface has an interactive voice response and/or DTMF signaling module that enables the user to interact with an automated system to initiate, join, modify, or terminate a communication session.

The application interface enables the users to interact with the communication bridge and also enables the communication bridge to negotiate with the user device to determine how the user device will implement the communication session. For example, the application interface may implement control and signaling to select a vocoder to be used by the user device for the communication session, and to adjust the rate at which the user device and communication session communicate. Other features of the underlying connection may likewise be negotiated when the user device connects to the communication bridge.

In one embodiment, during the communication session, the API may instruct the user to take corrective action to improve signals being generated by the user device. Thus, in this embodiment, the Bridge API is able to send information back to the participants. For example, the API can transmit a message to the end user suggesting a corrective action to be taken by the end user that may enable the end user to help improve audio quality on the communication session. For example, the API may instruct a participant on a noisy connection to mute their microphone to reduce the amount of noise on the conference call. Optionally, this may be implemented by the API directly controlling the noisy participant's device on the noisy participant's behalf.

The API may also remotely control and repair subscriber client problems such as audio and microphone gain. Where the participant is using a soft client implemented on a computer, for example, and the participant is talking on a headset, a separate microphone on the person's laptop may be simultaneously picking up the person's voice as well as picking up other ambient noise. The API can disable the laptop microphone or, alternatively, use the signal from the laptop for noise profiling and cancellation.

Likewise, the API can detect the audio level provided by a participant and signal the participant to talk louder or more softly, or to move the microphone away from a noise source to improve signal-to-noise ratio. Likewise, the API can interact directly with the end device to adjust the signal level provided by the end device automatically. This may enable API to mute the end device or adjust the audio gain at the end device to amplify the participant's voice if the participant is speaking softly, or decrease the amplification level if the participant is speaking loudly, to moderate the overall volume of each of the participants on the communication session.

The API may also take other corrective action or implement other processing actions on the end user device. For example, the context interface and inference engine 46 may determine processing to be performed on the signals provided from the user device 30A or on the signals provided to the user device 30A and instruct the user device 30A to implement all or part of these processes. Thus, in this embodiment, codec selection, echo processing, noise cancellation, and other pre and post processing functions may be implemented at the user device under the instruction of the API.

The user may also interact with the application interface to select particular features during the communication session. For example, the user may have a local mute control or, alternatively, the communication bridge may provide mute control. Thus, the application interface may enable the users to control whether their audio stream is selected to be output on the conference call. The application interface may also enable the user to select features for the call.

Depending on the particular user device, the application interface may also provide additional information to the participants during the communication session. For example, the application interface may provide information about the current talker so that participants can follow along with who is speaking at a particular point in time. The application interface may also enable users to specify the volume of the audio on the communication session as a whole and, optionally, on a per-speaker basis.

Where the audio bridge utilizes three dimensional audio mixing, the bridge may assign locations of particular individuals on the call and mix the audio so that it sounds, to other participants, that the sound is originating from the direction of where the individual is sitting. Examples of three dimensional audio mixing include using phase and delay audio processing to enable a user to have a spatial perception that the audio is originating to the left/right, or from the front/back. Different ways of implementing three dimensional audio have been developed and may be developed in the future, and the audio bridge may use these processing techniques to adjust the location of the participants for each user of the audio bridge. Thus, the directionality of the audio may help people determine who is talking on the communication session.

The application interface may also enable the user device to provide information to the conference bridge that may then be passed to the context interface to enable the conference bridge to know more about the overall context of the communication session as well as the particular context of this user on the communication session. For example, the application interface may detect the type of device connecting to the communication session, the type of client implemented on the device, and determine the types of features implemented on the device, such as whether the device will be employing any noise cancellation techniques during the communication session. The application interface may also detect the type of network connection (e.g. cellular, wireless IP, IP, POTS), and whether the caller is connecting from a residential connection or business connection. The application interface may also receive input from the user as to whether the call is being implemented outdoors or indoors, and may listen to the background noise levels during the initial connection (when the user is logging into the communication session) to determine the quality of the service being provided to the user and optionally the background noise level on the connection.

In a business context it is common to schedule meetings, e.g. telephone conferences, through a calendaring program. When the person also has a soft telephony client on their computer, the person may launch a communication session directly from their calendar program which then calls the telephony application to connect to the communication session. In this and other instances, information about the communication session may be gleaned from the participant's calendar, and the participant's role in the communication session may be provided to the application interface by the soft telephony client. For example, if the person was the one that organized the communication session that information may be provided to the application interface. Likewise, the person's role in the organization and the identity of the organization may be provided to the application interface when the user connects to the communication session.

Information collected by the application interface will be, in one embodiment, passed to a context interface 46. Although much of the context information may be collected by the application interface, the invention is not limited in this manner as other ways of collecting information for use by the context interface and inference engine may be implemented as well. The context interface 46 is discussed in greater detail below.

The communication bridge also has an audio bridge 34 that implements communication sessions. In FIG. 3, the media path is illustrated using thick lines and the flow of control information is shown using thin lines. The audio bridge includes a control 36, an audio mixer 38, and a selector 40. The control 36 interacts with the application interface 32 to selectively admit participants to one or more communication sessions being implemented by the audio bridge. The audio mixer performs the function of mixing signals to be transmitted to the participants on the communication sessions. The selector 40 selects one, two, three, or other small number of audio inputs to be mixed by the audio mixer and output on the communication session.

In operation, when a user joins a communication session via application interface 32, the application interface 32 will instruct the control 36 to add the user to a particular communication session that is to be started by the audio bridge 34 or to add the user to an already extant communication session being hosted by the audio bridge 34. Once the user is added to a communication session, the selector 40 will start to receive input from the user and, if appropriate, select audio by that user to be mixed into the output stream on the communication session. The audio mixer will also provide output audio from the communication session to the user once the user joins the communication session.

According to an embodiment of the invention, the communication bridge 12 includes an audio enhancer 42 that processes each user's audio independently according to context information 44 received from a context interface and inference engine 46. The audio enhancer includes a control 48 that programs an audio processor 50 to apply particular audio processing algorithms to the signals selected by the selector 40. Each channel provided by the selector 40 to the audio processor will be processed individually using separate audio processing algorithms so that the individual channel may be optimized according to the context associated with that particular channel. Although in the embodiment shown in FIG. 3 the selector 40 selects audio channels for processing by the audio processor 50, the invention is not limited in this regard as the audio processor may implement the selecting function if desired.

As noted above, in one embodiment, not all input audio channels will be mixed together by the audio mixer 38 for output to the users on the communication session. Accordingly, preferably, the selection process (whether implemented by selector 40 or audio processor 50) should be performed before audio processing so that only the relevant audio channels that will contribute to the communication session will be processed by the audio processor 50. In an alternate embodiment, a larger subset of the input audio channels will undergo some audio processing prior to the selection process. For example audio inputs from channels that are detected to have noise or gain issues may be preprocessed prior to the selection process in order to optimize the selection. Likewise, the signals may undergo gain adjustment prior to selection to make it easier for a person who naturally speaks softly to break into the conversation being hosted by the communication bridge.

Accordingly, as shown in FIG. 3, the communication bridge may include a pre-processor 41 configured to receive the input audio and process the signals before the signals are input to the selector. The type of processing to be performed by the pre-processor may be controlled by the audio enhancer 42 to enable pre-processing of the audio signals to be coordinated with post-processing. Likewise, the audio enhancer 42 may also provide input to the selector to help the selector determine which signals should be preferentially be selected to be output on the communication session.

In the embodiment shown in FIG. 3 the pre-processor 41, selector 40, audio processor 50, and audio mixer 38 are shown as separate boxes to help explain the different functions that may be implemented in connection with the audio signals. The invention is not limited in this manner as, optionally, several or all of these functions may be combined into a single FPGA or other programmable circuitry. Thus, for example, the signals may be input to a single chip that performs pre-processing, selection, audio processing, and audio mixing to output a plurality of individually mixed audio channels to the several participants to the communication session. Many ways of implementing the communication bridge are possible including software running on dedicated processors optimized for signal processing or on general purpose microprocessors.

The context interface and inference engine 46 provides context information to 44 to the audio enhancer 42 to instruct the audio enhancer as to the type of processing that should be performed on particular channels and optionally parameters that should be used in connection with processing particular audio channels.

The context interface collects information about each participant in the communication session. For example, in the illustrated embodiment the context interface and inference engine 46 receives input about the voice encoder (vocoder) 52 in use by the participant, the type of network connection 54, the type of device 56, and the communication client in use by the device 58. These parameters enable the context interface and inference engine 46 to learn about physical characteristics of the connection and device that may affect how signals provided by the user device should be processed in the audio processor.

The context interface also collects social context information about the communication session as a whole as well as about the user's participation in the communication session. For example, the context interface and inference engine 46 may receive input from the user's calendar 60 to learn the social context of the communication session. This enables communication bridge may implement different processing for business calls than it does for personal calls. Likewise, the organization and the person's role in the organization 62 may impact the quality of service provided by the bridge on the communication session. Similarly priority may be given to particular participants, such as customers on a sales conference call, to increase the quality of experience for those participants, make it easier for that particular participant to break into the conversation, or otherwise adjust the manner in which the participant is treated during the communication session.

The location that the person is calling from may also be relevant to the communication bridge 12. For example, if the person is calling from outside, the amount of ambient background noise may be higher than if the person is calling from a quieter indoor location. Similarly, if the person is calling from home rather than from an office the background noise characteristics on the audio provided by that person may be different.

The audio bridge may also look at the service quality 65 to determine how to process audio received from a particular user. For example, if the user is calling from home and has a relatively static riddled connection, the communication bridge may want to filter the signal to try to eliminate some of the static from the connection. Other service quality factors may be determined as well. The audio bridge may also use Session Priority 66 with Business Factors rules 70 to determine how to allocate the resources of the bridge to optimize the quality, costs and capacity. For example, conference calls with customers may take priority for compute resources over internal conference calls in a business environment. In a conference bridge running as a service, priority may be given to customers with premium subscriptions versus others paying lower fees.

The audio bridge may keep a record of optimizations, inferences and connection issues and context in the context history 80. The context history can be used as the starting point settings for audio processing. For example a user who has consistently high gain can have gain reduction automatically applied when they call in to the bridge. In addition to user identification, the other context inputs such as user device, connection type, codec, etc. can be kept in the context history. To optimize storage, the context of only the most frequent and high priority users may be stored.

The audio enhancer receives input from the context interface and inference engine 46 and combines that with quality of experience factors 68 and business factors 70 to determine how to process the signals in audio processor 50. Quality of experience factors 68 are factors that describe user perception of communication session properties. For example, echo cancellation or suppression may be important to implement to prevent excessive echo from interfering with sound fidelity. A quality of experience factor for echo suppression may specify that an optimal Total Echo Loudness Ratio (TELR) value, as well as an acceptable TELR value. These TELR values may depend on the particular context of the conference call and other factors.

For example, a business conference call may be less tolerant of echo and, hence, a first set of optimal and acceptable TELR values may be specified for business conference calls. Teenagers may have a different tolerance for echo and, hence, a second set of optimal and acceptable TELR values may be specified for this class of users. Similarly, relatives talking amongst themselves to discuss family matters may have a different tolerance for echo and, hence, a third set of optimal and acceptable TELR values may be specified for this class of users.

In addition to echo, optimal and acceptable thresholds may be specified for other audio properties such as noise levels, overall loudness values, and other similar properties as well. The quality of experience factors thus give the audio enhancer target values to prevent the audio enhancer from over-processing signals to increase a particular property (e.g. echo cancellation) where doing so would not perceptibly increase the overall sound quality to the end users but may take unnecessary compute resources The business factors enable cost and session priority to be factored into determining how signals should be processed by the communication bridge. Particular processes may be computationally intensive and, hence, occupy a greater percentage of the processing capabilities of the communication bridge. Since the communication bridge has finite computational resources, implementing computationally intensive processes limits the number of communication sessions that the communication bridge can handle. Where the owner of the communication bridge is paid based on the number of communication sessions, implementing computationally intensive processes may affect the revenue generated by the communication bridge.

The business factors enable business decisions to be implemented so that the communication bridge is able to optimize not only the quality of experience for participants on the communication session, but is also able to optimize the amount of revenue the bridge is able to generate on the network. For example, the business factors may enable the communication bridge to implement higher quality processing for communication sessions while the bridge is lightly loaded, and then substitute lesser quality processing for less important communication sessions as the bridge becomes more congested. This enables the bridge to adjust to the load conditions to maximize revenue by adjusting how the audio enhancer processes extant communication sessions.

The context interface and inference engine receives these types of inputs and possibly other inputs and determines appropriate audio processing algorithms for the signal. This enables the conference bridge to enhance conference user experience by providing superior audio performance, tunable to the social context and the individual participants, to increase collaboration effectiveness by integrating business intelligence over a traditional audio bridge.

The audio processor may implement many different types of processing techniques for particular individual participants, to optimize the sound quality for that participant on the communication session. One example type of processing may be to determine whether linear or non-linear approach to echo control should be implemented. In particular, if a linear approach to echo processing is selected an echo canceller may be used, whereas a non-linear approach would require the use of echo suppression rather than echo cancellation. Echo cancellation is a process by which the audio processor 50 may learn which part of a received signal is the actual signal and which part is the echo. An adaptive filter may then be built to subtract the echo from the signal. This enables the echo to be subtracted or cancelled from the signal so that, in theory, the echo may be removed from the signal with minimal impact on the non-echo signal.

Echo suppression, by contrast, does not remove only the echo portion of the signal but rather can block the entire reverse signal. Since echo travels back towards the speaker, one common approach is to block audio in the reverse direction to reduce the perception of echo on the line. While this is simpler than echo cancellation, since an adaptive filter does not need to be created, it prevents both people from talking at the same time. In particular, when a first person is talking, if a second person starts to talk, the echo suppression may think that the audio traveling from the second person toward the first person is echo, in which case it will thus suppress the audio from the second person. Accordingly, with echo suppression it is difficult to have a full duplex conversation There are several ways to determine whether a linear approach to echo control should be implemented (echo cancellation) or whether a non-linear approach should be used (echo suppression). One way to do this is to look at the vocoder type being used by that particular user. There are many vocoders that have been specified over the years, typically by the ITU in the form of G.xxx series standards. For example, G.711, G.726, and G.722 vocoders are generally linear and, accordingly, echo cancellation may be used in connection with a call implemented using one of these vocoders. By contrast, G.720, EVRC and variants, AMR, G.723.1, G.722.2 are typically non-linear and, accordingly, echo suppression may have to be used where one of these vocoders is in use by a communication session participant. Frequently, mobile users may be using a vocoder such as Enhanced Variable Rate Codec (EVRC) or Adaptive Multi-Rate Compression (AMR), business users often use vocoders such as G.702/G.711/G.722, and home based residential users often will use a G.729 or G.711 vocoder. Accordingly the type of network connection may impact the particular vocoder in use by that person.

The selection of echo suppression or echo cancellation is implemented separately by the context interface and inference engine 46 for each person that joins a communication session so that optimal echo processing may be implemented for that particular person.

In addition to the vocoder type, network impairments may also indicate a need to deploy non-linear echo suppression. Example network impairments that may be detected include packet loss and jitter, which may be further characterized according to patterns, rate of spikes, burst size, frequency/occurrence, etc. Measured jitter characteristics such as rate of spikes may indicate a frequent change in network jitter characteristics. If the packet loss rate exceeds the rate below which standard packet loss concealment algorithm operates with minor artifacts, then echo suppression should be used instead of echo cancellation.

In addition to performing echo processing on a per-user basis, the audio enhancer can also implement noise control on a per-user basis. Where there is background noise on a channel, it is desirable to implement some form of noise suppression to reduce the background noise. However, it is important to not be too aggressive in suppressing noise as the noise suppression may also destroy the signal that is of interest on the channel.

According to an embodiment of the invention, the level and type of noise suppression can be adjusted depending on the particular characteristics of the communication channel with the particular user and the location of the user and context info such as type of conversation (business/casual). Typically the noise reduction engine may be implemented by the audio enhancer, although the invention is not limited in this manner.

In one embodiment, the level and type of noise suppression can be adjusted based on the vocoder type between the talker and noise reduction engine. There are two general types of vocoders—waveform vocoders which preserve the original waveform, and parametric vocoders which decompress the original signal into components and then individually compress the components. If a waveform vocoder is used, such as G.711 or G.726, then the noise suppression algorithm can be more aggressive. If a parametric vocoder is used, then, depending on the compression rate, noise suppression should be less aggressive.

Additionally, noise floor measurements may be used to determine the ratio of the noise to the signal. If the ambient noise floor is above a particular threshold, a notice may be sent to the participant via the application interface 32 to enable the participant to modify conditions in the area of the user device to help reduce the noise threshold. For example, the participant may be on speaker phone and the microphone of the device may be located too close to a noise source such as a computer fan, projector fan, or other type of noise source. The participant may not be aware that the fan is causing significant noise on the call. Providing the participant with a notification may enable the participant to move the phone or switch to a headset rather than a speaker phone.

Similarly, outdoor environments are typically louder than indoor environments. If the person is talking from outside, compensation/adjustments may be made to reduce the amount of noise on the signal. For example, the noise cancellation process may be more aggressive where the person is talking from an outdoor location than where the person is talking from an indoor location.

Accordingly, as discussed above, the context of each participant is collected and processed by the context interface and inference engine. The context may include the participant's name, role in the company, the conversation type (business, casual, relatives, teens) that help the context interface and inference engine to determine the required quality of the audio on the communication session. For example, a business conference call may need to be supported differently, and have different audio qualities, than a conference call between a group of teenaged people or a family conference call between a group of relatives. Thus, the reason behind the communication session may be used to determine required quality of experience thresholds based on the expectations associated with the social context. These quality of experience factors may then be used to adjust processing of the call, in terms of echo suppression, noise reduction, volume balancing, etc., that is implemented by the audio processor on audio streams to be mixed together on the communication session.

In one embodiment, the communication bridge uses the context information available about the participants and the context of the call, as well as physical information about the type of device, type of network connection, and other properties associated with how the participants are connected to the communication bridge, to determine whether improvement to some factor that affects quality of experience is possible. For example, the communication bridge may determine whether it is possible to improve echo cancellation, noise reduction, loudness ratios, or another factor. The communication bridge may then determine whether the available mechanism will improve the factor sufficiently to alter the end user quality of experience. If not, there is no reason to apply the available mechanism. Even if the communication bridge can use the available mechanism to improve the end user quality of experience, the communication bridge may look at the social context associated with the communication session to determine whether it is worth-while doing so from a business perspective.

Mechanism for Dynamic Coordination of Signal Processing Network Equipment (MDCSPNE) is a draft ITU-T Recommendation to coordinate signal processing features for voice quality enhancement. Depending on the particular implementation, application of different voice quality enhancements at different places on the network may cause undesirable degradations due to unintended interference between the processes. By implementing the multiple voice quality enhancement processes via an audio processor at the communication bridge, these enhancements may be coordinated to avoid this type of unintended interference and the attendant potential audio quality degradation.

In the embodiment shown in FIG. 3, the communication bridge includes a service assurance interface 72 that receives input from the network as to the state of the network and through which the communication bridge may take remedial actions. The service assurance interface also provides the state of the bridge and the audio functioning to the service assurance system to enable the service assurance system to know how the bridge is functioning over time. Likewise, the service assurance system may provide operational information as to the state of the network to enable the communication bridge to learn how the network is operating. For example, as noted above, the packet loss rate and jitter characteristics of the network may help the communication bridge to determine which type of echo processing to use. The service assurance interface 72 can obtain information as to the operational state of the network to help the context interface and inference engine determine these parameters when implementing echo processing for particular signals.

It should be understood that all functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation.

The control logic may be implemented as a set of program instructions that are stored in a computer readable memory within the network element and executed on a microprocessor. However, in this embodiment as with the previous embodiments, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. An enhanced communication bridge, comprising:
an audio bridge to implement a communication session hosted by the communication bridge, the audio bridge receiving an associated input audio stream from each communication session participant of a plurality of communication session participants and selecting a subset of the input audio streams to be mixed for presentation to the communication session participants;
a context interface and inference engine to determine a communication context for at least one communication session participant and receive, in conjunction with initiation of the communication session, social context information that identifies a social context associated with the communication session, the social context information comprising calendar information regarding the communication session, and, based on the communication context and the social context, select a set of voice quality enhancement processes from a plurality of voice quality enhancement processes to be applied to the input audio stream associated with the at least one communication session participant; and
an audio enhancer to receive the input audio stream associated with the at least one communication session participant from a decoder and perform audio processing on the input audio stream associated with the at least one communication session participant so that the set of voice quality enhancement processes is applied to the input audio stream associated with the at least one communication session participant before being mixed for presentation to the communication session participants.

2. The enhanced communication bridge of claim 1, wherein the communication context for the at least one communication session participant includes a network context for the at least one communication session participant.

3. The enhanced communication bridge of claim 2, wherein the network context is determined, at least in part, via an interface to a network service assurance system.

4. The enhanced communication bridge of claim 1, wherein the context interface and inference engine further uses quality of experience factors to select the set of voice quality enhancement processes to be applied to the input audio stream associated with the at least one communication session participant.

5. The enhanced communication bridge of claim 4, wherein the context interface and inference engine further uses business factors to determine whether particular voice quality enhancement processes are too expensive to be applied to the input audio stream associated with the at least one communication session participant.

6. The enhanced communication bridge of claim 4, wherein the quality of experience factors are selected based on the social context of the communication session.

7. The enhanced communication bridge of claim 1, wherein the voice quality enhancement processes comprise echo control, gain control, and noise suppression processes.

8. The enhanced communication bridge of claim 7, wherein the echo control comprises selecting to implement echo cancellation and echo suppression for the input audio stream associated with the at least one communication session participant based on a type of vocoder used to decode the input audio stream associated with the at least one communication session participant.

9. The enhanced communication bridge of claim 8, wherein the echo cancellation is employed if a waveform-preserving vocoder is in use on the input audio stream associated with the at least one communication session participant.

10. The enhanced communication bridge of claim 8, wherein the echo suppression is employed if a vocoder with non-linear characteristics is used to decode the input audio stream associated with the at least one communication session participant.

11. The enhanced communication bridge of claim 7, wherein a first level of noise suppression is implemented on the input audio stream associated with the at least one communication session participant if the input audio stream associated with the at least one communication session participant is decoded with a waveform-preserving vocoder and a second level of noise suppression is implemented on the input audio stream associated with the at least one communication session participant if the input audio stream associated with the at least one communication session participant is decoded with a parametric vocoder, wherein the first level is a greater level of noise suppression than the second level.

12. The enhanced communication bridge of claim 1, wherein the context interface and inference engine also determines a social context of at least one of the communication session participants and adjusts how the audio enhancer performs audio processing based on the social context of the at least one communication session participant.

13. The enhanced communication bridge of claim 1, wherein the social context is used to prioritize business-related communication sessions over personal communication sessions.

14. The enhanced communication bridge of claim 1, wherein the communication bridge is configured to provide instructions to at least one of the communication session participants during the communication sessions.

15. The enhanced communication bridge of claim 14, wherein one of the instructions is a message that instructs at least one of the communication session participants to move a communication device that is being used to connect the at least one of the communication session participants to the communication session away from a source of noise.

16. The enhanced communication bridge of claim 14, wherein one of the instructions is a message that instructs one of the communication session participants to activate a mute function on a communication device that is being used to connect the one of the communication session participants to the communication session.

17. The enhanced communication bridge of claim 1, wherein the communication bridge is configured to control and adjust a gain level, noise reduction, mute, or codec selection of a communication device associated with at least one of the communication session participants based on quality of experience and business factors.

18. The enhanced communication bridge of claim 1, wherein the communication bridge is configured to detect a type of communication device in use by at least one of the communication session participants and provide the type of communication device information to the context interface and inference engine.

19. The enhanced communication bridge of claim 1, wherein the communication bridge handles video data as well as audio data.

20. The enhanced communication bridge of claim 1, wherein the communication bridge maintains a history of processing actions used in connection with previous communication sessions and uses the history to determine initial settings for the communication session.

21. The enhanced communication bridge of claim 1, wherein the social context information also comprises organizational information identifying a role of the at least one communication session participant in an organization.

\* \* \* \* \*